United States Patent
Chang et al.

(10) Patent No.: US 8,767,663 B2
(45) Date of Patent: Jul. 1, 2014

(54) COMPONENT CARRIER MANAGEMENT METHOD AND EQUIPMENT

(75) Inventors: Junren Chang, Beijing (CN); Yajuan Li, Beijing (CN); Shulan Feng, Beijing (CN); Yinghui Yu, Beijing (CN); Yuhua Chen, Beijing (CN); Li Chai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/553,530

(22) Filed: Jul. 19, 2012

(65) Prior Publication Data

US 2012/0281667 A1 Nov. 8, 2012

Related U.S. Application Data

(63) Continuation of application No. PCT/CN2010/079598, filed on Dec. 9, 2010.

(30) Foreign Application Priority Data

Jan. 30, 2010 (CN) .......................... 2010 1 0106228

(51) Int. Cl.
  *H04W 4/00* (2009.01)
  *H04B 7/216* (2006.01)
(52) U.S. Cl.
  USPC .......................................... 370/329; 370/335
(58) Field of Classification Search
  USPC ............................ 370/329, 335, 336; 455/450
  See application file for complete search history.

(56) References Cited

U.S. PATENT DOCUMENTS

| 8,184,599 B2 * | 5/2012 | Gholmieh et al. ............ 370/335 |
| 2001/0134774 | 6/2011 | Pelletier et al. |
| 2011/0134774 A1 | 6/2011 | Pelletier et al. |
| 2011/0194516 A1 * | 8/2011 | Aiba et al. ..................... 370/329 |
| 2012/0188886 A1 | 7/2012 | Chen et al. |

FOREIGN PATENT DOCUMENTS

| CN | 201010106228.0 | 1/2010 |
| CN | 101784081 A | 7/2010 |
| CN | 101959249 B | 9/2012 |

OTHER PUBLICATIONS

Extended European Search Report issued in corresponding European Patent Application No. 10844466.2, mailed Dec. 3, 2012.
Sharp, "Dynamic Update of PDCCH Monitoring Set" Agenda Item 7.1.5, 3GPP TSG-WG1#59bis. Valencia, Spain, Jan. 18-22, 2010. R1-100162.
Alcatel-Lucent, "Component Carrier Indication for Bandwidth Extension on LTE-A" Agenda Item 15.4, 3GPP TSG-RAN WG1 #57bis. Los Angeles, CA, Jun. 29-Jul. 3, 2009. R1-092330.

(Continued)

*Primary Examiner* — Afshawn Towfighi
(74) *Attorney, Agent, or Firm* — Brinks Gilson & Lione

(57) ABSTRACT

A component carrier management method which relates to the communication technical field includes determining one or more component carriers that are required to be added into a physical downlink control channel monitoring set; sending a component carrier activation or configuration message to a user equipment to indicate one or more component carriers that are required to be added into the physical downlink control channel monitoring set. Through the technical solutions, the PDCCH monitoring set of the UE may be managed when CCs are activated or configured, so that the UE may maintain the PDCCH monitoring set in real time, implement monitoring on the CCs in the monitoring set, and ensure a service requirement of the UE.

26 Claims, 8 Drawing Sheets

---

Determine, in component carriers to be activated or to be configured, one or more component carriers that are required to be added into a physical downlink control channel monitoring set.   S11

↓

Send a component carrier activation or configuration message to a user equipment to indicate one or more component carriers that are required to be added into the physical downlink control channel monitoring set.   S12

(56) References Cited

OTHER PUBLICATIONS

Written Opinion of the International Searching Authority issued in corresponding PCT Patent Application No. PCT/CN2010/079598, mailed Mar. 17, 2011.
Motorola, "PDCCH Monitoring for LTE-A" Agenda Item 7.2.1.1, 3GPP TSG RAN WG1 Meeting #59. Jeju, Korea, Nov. 9-13, 2009. R1-094829.
Philips, "PDCCH Design and Monitoring Set for Carrier Aggregation" Agenda Item 7.2.1.1, 3GPP TSG RAN WG1 Meeting #59. Jeju, South Korea, Nov. 9-13, 2009. T-doc R1-094990.
RAN WG1, "LS on PDCCH Monitoring Set for Carrier Aggregation in LTE-Advanced" 3GPP TSG RAN WG1 Meeting #59. Jeju, Korea, Nov. 9-13, 2009.
Ericsson, "Activation and Deactivation of Component Carriers" Agenda Item 7.3.3, 3GPP TSG-RAN WG2 #68. Jeju, Korea, Oct. 9-13, 2009. Tdoc R2-096752.

* cited by examiner

COMPONENT CARRIER MANAGEMENT METHOD AND EQUIPMENT

CROSS-REFERENCE TO RELATED APPLICATIONS

This application is a continuation of International Application No. PCT/CN2010/079598, filed on Dec. 9, 2010, which claims priority to Chinese Patent Application No. 201010106228.0, filed on Jan. 30, 2010, both of which are hereby incorporated by reference in their entireties.

FIELD OF THE APPLICATION

The present application relates to the communication field, and in particular, to a component carrier management method and equipment.

BACKGROUND OF THE APPLICATION

To fulfill the requirement of the IMT-Advanced (International Mobile Telecommunications-Advanced), a peak data rate up to 1 Gbits/s is supported, and it is already agreed currently that the carrier aggregation (CA, Carrier Aggregation, also referred to as carrier aggregation) technology is used as a system bandwidth extension method for a 3GPP LTE-ADVANCED (LTE-A, LTE-Advanced) system. The carrier aggregation technology aggregates multiple component carriers (CCs, Component Carriers) into a larger bandwidth (for example, higher than 20 MHz) to support a high data transmission rate. For example, five 20-MHz component carriers may be aggregated into a downlink transmission bandwidth with 100 MHz.

To reduce blind detection complexity of a UE (User Equipment, user equipment) and reduce interferences among cells, a PDCCH (Physical Downlink Control Channel, physical downlink control channel) monitoring set and a PDSCH (Physical Downlink Shared Channel, physical downlink shared channel) set may be divided from multiple CCs. The CCs in the PDSCH set are component carriers used by the UE for receiving and sending data within a certain period of time. The component carrier is a downlink component carrier, an uplink component carrier or an uplink/downlink component carrier pair. The CCs in the PDCCH monitoring set are component carriers for sending scheduling information to the UE. Specifically, the scheduling information is transmitted through PDCCH signaling. The PDCCH monitoring set may be a subset of the PDSCH set. For a UE, the PDCCH monitoring set of the UE is a component carrier set on which the UE performs PDCCH monitoring to obtain scheduling information. For example, it is assumed that 5 component carriers exist currently, the component carriers are CC1 to CC5, the PDSCH set may be formed of 4 component carriers CC2 to CC5, and the PDCCH monitoring set may be formed of two component carriers CC2 and CC3. That is, when the UE uses four component carriers CC2 to CC5 for receiving and sending data, the UE may only monitor PDCCH channels of CC2 and CC3 to acquire scheduling information on CC2 to CC5.

During activation or configuration of the CC, how to manage the PDCCH monitoring set and implement monitoring on a corresponding CC becomes a problem.

SUMMARY OF THE APPLICATION

An embodiment provides a component carrier management method, which includes:

determining, in component carriers to be activated or to be configured, one or more component carriers that are required to be added into the physical downlink control channel monitoring set; and sending a component carrier activation or configuration message to a user equipment to indicate the one or more component carriers that are required to be added into the physical downlink control channel monitoring set.

An embodiment provides another component carrier management method, which includes:

receiving a component carrier activation or configuration message, and acquiring, through the component carrier activation or configuration message, one or more component carriers that are required to be added into the physical downlink control channel monitoring set; and adding the one or more component carriers that are required to be added into the physical downlink control channel monitoring set to the physical downlink control channel monitoring set.

An embodiment provides a base station, which includes:

an update determination unit, configured to determine, in component carriers to be activated or to be configured, one or more component carriers that are required to be added into a physical downlink control channel monitoring set; and a first update indication unit, configured to send a component carrier activation or configuration message to a user equipment to indicate the one or more component carriers that are required to be added into the physical downlink control channel monitoring set.

An embodiment provides a user equipment, which includes:

a message receiving unit, configured to receive a component carrier activation or configuration message, and acquire, through the component carrier activation or configuration message, one or more component carriers that are required to be added into a physical downlink control channel monitoring set; and a first update execution unit, configured to add the one or more component carriers that are required to be added into the physical downlink control channel monitoring set in the physical downlink control channel monitoring set.

An embodiment provides another component carrier management method, which includes:

sending, to a user equipment, an instruction message of activating one or more component carriers;

sending scheduling information of the one or more component carriers on a component carrier in a current physical downlink control channel monitoring set, or sending scheduling information of each component carrier on the each component carrier in the one or more component carriers; and sending a physical downlink control channel monitoring set update command to the user equipment to instruct the user equipment to update the physical downlink control channel monitoring set.

An embodiment provides another component carrier management method, which includes:

receiving an instruction message of activating one or more component carriers;

receiving scheduling information of the one or more component carriers on a component carrier in a current physical downlink control channel monitoring set, or receiving scheduling information of each component carrier on the each component carrier in the one or more component carriers; and receiving a physical downlink control channel monitoring set update command, and according to an instruction of the physical downlink control channel monitoring set update command, updating the physical downlink control channel monitoring set.

An embodiment provides another base station, which includes:

an activation instruction unit, configured to send, to a user equipment, an instruction message of activating one or more component carriers;

a scheduling information sending unit, configured to send scheduling information of the one or more component carriers on a component carrier in a current physical downlink control channel monitoring set, or send scheduling information of each component carrier on the each component carrier in the one or more component carriers; and an update instruction unit, configured to send a physical downlink control channel monitoring set update command to the user equipment to instruct the user equipment to update the physical downlink control channel monitoring set.

An embodiment provides another user equipment, which includes:

an instruction message receiving unit, configured to receive an instruction message of activating one or more component carriers;

a scheduling information obtaining unit, configured to receive scheduling information of the one or more component carriers on a component carrier in a current physical downlink control channel monitoring set, or receive scheduling information of each component carrier on the each component carrier in the one or more component carriers; and an update execution unit, configured to receive physical downlink control channel monitoring set update command, and according to an instruction of the physical downlink control channel monitoring set update command, update the physical downlink control channel monitoring set.

BRIEF DESCRIPTION OF THE DRAWINGS

To illustrate the technical solutions according to the embodiments or in the prior art more clearly, the accompanying drawings for describing the embodiments or the prior art are introduced briefly in the following. Apparently, the accompanying drawings in the following description are only some embodiments, and persons of ordinary skill in the art can derive other drawings from the accompanying drawings without creative efforts.

DETAILED DESCRIPTION OF THE EMBODIMENTS

The technical solutions in the embodiments will be clearly and completely described in the following with reference to the accompanying drawings. It is obvious that the embodiments to be described are only exemplary. All other embodiments obtained by persons skilled in the art based on the embodiments without creative efforts shall fall within the protection scope of the claims.

Figure 1:
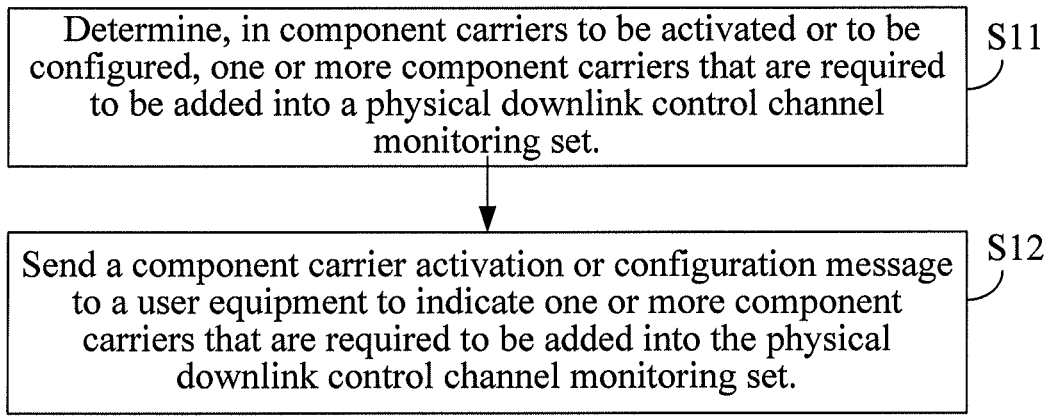
FIG. 1 is a schematic diagram of a component carrier management method provided in an embodiment.

FIG. 1 is a schematic diagram of a component carrier management method provided in an embodiment, the method includes:

Step S11: Determine, in component carriers to be activated or to be configured, one or more component carriers that are required to be added into a physical downlink control channel monitoring set;

Step S12: Send a component carrier activation or configuration message to a user equipment to indicate the one or more component carriers that are required to be added into the physical downlink control channel monitoring set.

In this embodiment, when one or more component carriers are being activated or configured, the one or more component carriers required to be added into the physical downlink control channel monitoring set in the one or more component carriers that are activated or configured are notified to the user equipment, so as to maintain the physical downlink control channel monitoring set of the user equipment in real time, guarantee a service requirement of the user equipment, and reduce an activation time delay of the component carrier. In the embodiment, it may also be instructed through a component carrier activation or configuration message to add a component carrier which is already in an activated state and is not yet added into the PDCCH monitoring set into the PDCCH monitoring set.

In this embodiment, the component carrier activation or configuration message may be further used for indicating a component carrier monitored on the one or more component carriers that are required to be added into the physical downlink control channel monitoring set, or a component carrier that is required to be replaced or removed from the physical downlink control channel monitoring set.

Optionally, a base station may send a physical downlink control channel command, a MAC control PDU or an RRC message to the user equipment to activate one or more component carriers, and indicate the one or more component carriers that are required to be added into the physical downlink control channel monitoring set. Indication information in the physical downlink control channel command, the MAC control PDU or the RRC message may be adopted to indicate the one or more component carriers that are required to be added into the physical downlink control channel monitoring set, and the indication information may have one or more bits.

Optionally, the physical downlink control channel command may also be used for indicating a component carrier scheduled on the one or more component carriers that are required to be added into the physical downlink control channel monitoring set. If 4 component carriers A, B, C, and D are activated, the component carriers A and B are required to be added into the physical downlink control channel monitoring set, it may be further instructed to schedule the component carrier C on the component carrier A and schedule the component carrier D on the component carrier B. That is to say, while the one or more component carriers that are required to be added into the physical downlink control channel monitoring set are indicated, a component carrier that can be scheduled by the one or more component carriers that are added into the physical downlink control channel monitoring set is further indicated, that is, a linkage (linkage) relationship between one or more component carriers that are newly added into the physical downlink control channel monitoring set and a component carrier that is required to be scheduled is indicated.

The indicating the user equipment of the one or more component carriers that are required to be added into the physical downlink control channel monitoring set may further include: indicating the user equipment of a component carrier that is required to be replaced or removed from the physical downlink control channel monitoring set, for example, a remaining bit in the physical downlink control channel command may be used for indicating the component carrier that is required to be replaced or removed from the physical downlink control channel monitoring set. A bit in the physical downlink control channel command is used for indicating activation of the component carrier and update of the physical downlink control channel monitoring set, and the remaining bit may further be used for indicating the component carrier that is required to be replaced or removed from the physical downlink control channel monitoring set, that is, if the component carriers A and B are required to be added into the physical downlink control channel monitoring set, component carriers E and F in the original physical downlink control channel monitoring set may be replaced by the component carriers A and B or be removed. Optionally, in this embodiment, a physical downlink control channel command used for activation and a physical downlink control channel command used for updating a physical downlink control channel monitoring set may be multiplexed, that is, one or more bits in the physical downlink control channel command are used as instruction information for instructing whether the physical downlink control channel command is used for activating one or more component carriers or used for updating a physical downlink control channel monitoring set. In addition, the physical downlink control channel command may also be replaced by a MAC control protocol data unit or an RRC message.

Optionally, a base station may send radio resource control signaling to the user equipment to reallocate or reconfigure one or more component carriers for the user equipment and indicate one or more component carriers that are required to be added into the physical downlink control channel monitoring set. The radio resource control signaling may be a radio resource control connection reconfiguration message. The base station may activate one or more component carriers of the user equipment through the radio resource control connection reconfiguration message, that is, the radio resource control signaling is used to implement reconfiguration of the component carrier and activation of the component carrier at the same time. The base station may also implement the activation of the component carrier through the component carrier activation command after the component carrier is reconfigured by using the radio resource control signaling. In this embodiment, the base station may further send a physical downlink control channel monitoring set update message to the user equipment to instruct the user equipment to update the physical downlink control channel monitoring set. The physical downlink control channel monitoring set update message may be one separate physical downlink control channel monitoring set update command, and may also use a medium access control protocol data unit or physical layer control signaling as the update message. The base station indicates, through the radio resource control signaling, one or more component carriers that are required to be added into a physical downlink control channel monitoring set, so as to enable the user equipment to update the physical downlink control channel monitoring set according to the instruction, that is, scheduling information of a newly activated or configured component carrier is monitored and obtained on a component carrier in the updated physical downlink control channel monitoring set, and after the scheduling information is obtained, the user equipment again is instructed to update the physical downlink control channel monitoring set. For example, the user equipment may acquire newly configured component carriers A, B, C, and D according to an instruction of the radio resource control signaling from the base station, the base station indicates that the component carriers A and B are required to be added into the physical downlink control channel monitoring set, and sends scheduling information of the component carriers A, B, C, and D on the component carriers A and B. The user equipment acquires the scheduling information of the component carriers A, B, C, and D by monitoring the component carriers A and B, and subsequently the base station may further instruct the user equipment to add a component carrier E to the physical downlink control channel monitoring set, that is, implement subsequent update.

Optionally, during the process that the user equipment is handed over from a source base station to a target base station, the source base station may send a handover command to the user equipment, and the one or more component carriers that are required to be added into the physical downlink control channel monitoring set are indicated in the handover command.

Figure 2:
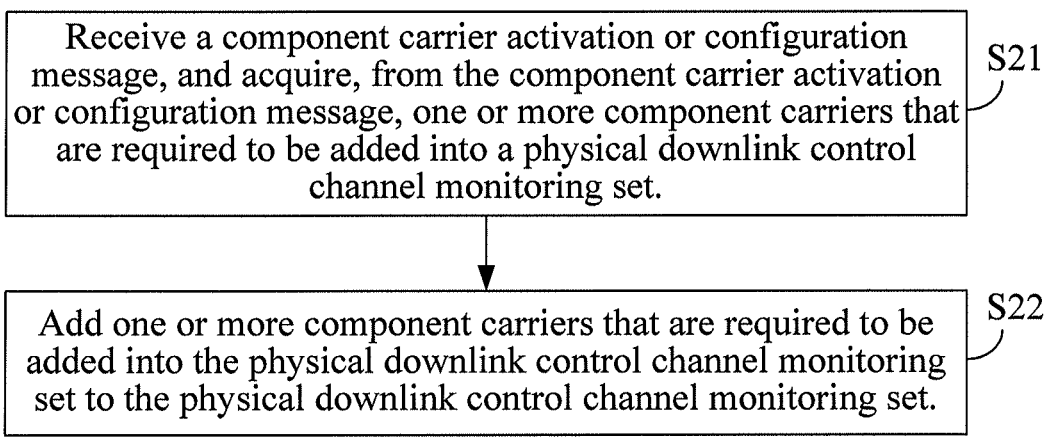
FIG. 2 is a schematic diagram of another component carrier management method provided in an embodiment.

FIG. 2 is a schematic diagram of another component carrier management method provided in an embodiment, in which the method includes:

Step S21: Receive a component carrier activation or configuration message, and acquire, through the component carrier activation or configuration message, one or more component carriers that are required to be added into a physical downlink control channel monitoring set.

Step S22: Add the one or more component carriers, which are required to be added into the physical downlink control channel monitoring set, to the physical downlink control channel monitoring set.

In this embodiment, when the component carrier activation or configuration message is received, which component carriers that are required to be added into the physical downlink control channel monitoring set are acquired, and the physical downlink control channel monitoring set is updated and maintained in real time, so as to guarantee a service requirement of the user equipment, and reduce an activation time delay of a component carrier. In this embodiment, by receiving the component carrier activation or configuration message, the UE acquires one or more component carriers that are required to be activated or configured. The one or more component carriers that are required to be added into the physical downlink control channel monitoring set may be all or a part of component carriers of the activated or configured one or more component carriers. In the embodiment, according to an instruction message from the base station, it may also be acquired that a component carrier that is already in an activated state and is not yet added into the PDCCH monitoring set is required to be added into the PDCCH monitoring set.

Optionally, the user equipment may receive a physical downlink control channel command from the base station, and acquire one or more component carriers that are required to be activated and one or more component carriers that are required to be added into the physical downlink control channel monitoring set. The one or more component carriers that are required to be added into the physical downlink control channel monitoring set may be a part of carriers in the activated component carriers. Optionally, the user equipment may acquire, through an instruction of one or more bits in the physical downlink control channel command, one or more component carriers that are required to be added into the physical downlink control channel monitoring set. Optionally, the UE may feed back a physical downlink control channel monitoring set update acknowledge message to the base station after update of the physical downlink control channel monitoring set is completed. The user equipment may also acquire, through the physical downlink control channel command, a component carrier scheduled on the one or more component carriers that are required to be added into the physical downlink control channel monitoring set, and/or acquire, through the physical downlink control channel command, a component carrier that is required to be replaced or removed from the physical downlink control channel monitoring set. The user equipment may acquire, through the instruction information included in the command, whether the physical downlink control channel command is used for activating one or more component carriers or used for updating the physical downlink control channel monitoring set, after the physical downlink control channel command is received. In addition, the physical downlink control channel command may also be replaced by a MAC control protocol data unit or an RRC message.

Optionally, the user equipment may receive radio resource control signaling sent by the base station, and acquire a component carrier configured for the user equipment by base station and one or more component carriers that are required to be added into the physical downlink control channel monitoring set. The radio resource control signaling may further include a component carrier activation function, so that the user equipment can acquire which component carriers require activation and activates the component carriers. The user equipment may also obtain a separate component carrier activation command and activate a corresponding component carrier. The user equipment acquires one or more component carriers, which are required to be added into the physical downlink control channel monitoring set, by obtaining radio resource control signaling, and updates the physical downlink control channel monitoring set according to an instruction, that is, scheduling information of a newly activated or configured component carrier on the component carriers in the updated physical downlink control channel monitoring set is monitored and obtained.

Optionally, during the process that the user equipment is handed over from a source base station to a target base station, a handover command sent by a source base station may be received, and one or more component carriers that are required to be added into the physical downlink control channel monitoring set are acquired through the handover command.

Optionally, after the update of the physical downlink control channel monitoring set is completed, the user equipment subsequently may further obtain a physical downlink control channel monitoring set update command from a base station, and update the physical downlink control channel monitoring set according to an instruction of the command.

Figure 3A:
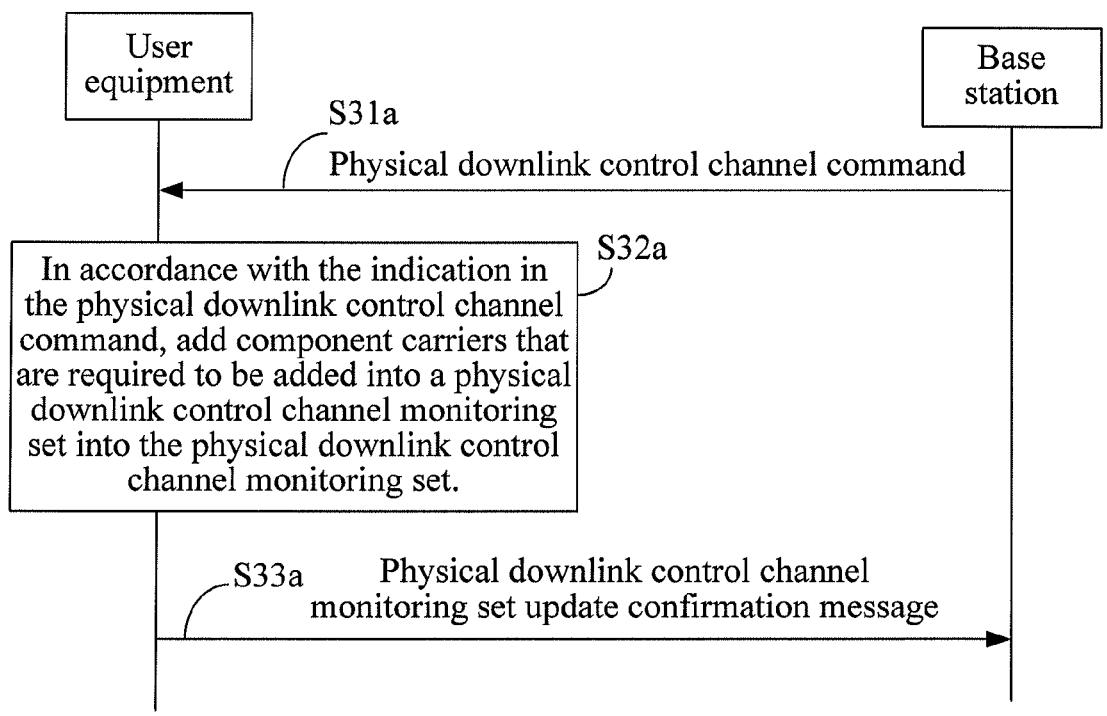
FIG. 3a is a simplified flow chart schematic diagram of a component carrier management method provided in an embodiment.

FIG. 3a is a simplified flow chart schematic diagram of a component carrier management method provided in an embodiment, in which the method includes:

Step S31a: The base station sends a physical downlink control channel command to a user equipment to activate one or more component carriers, and indicate one or more component carriers that are required to be added into a physical downlink control channel monitoring set.

Optionally, a base station (eNB, eNodeB) may send a PDCCH command to the UE to activate one or more component carriers for the UE, and indicate, through one or more bits (Bits) in the PDCCH command, whether it is required to activate a component carrier and at the same time add the component carrier to the PDCCH monitoring set. The eNB may add the one or more CCs to the PDSCH set to activate the CCs, and the activated CCs may be used for data transmission. Optionally, the eNB may also respectively indicate whether each component carrier of multiple newly activated component carriers is required to be added into the PDCCH monitoring set, for example, the eNB may respectively use a bit to indicate whether each component carrier is required to be added into the PDCCH monitoring set. In addition, the eNB may also indicate, in a concentrated manner, whether newly activated component carriers are required to be added into the PDCCH monitoring set, that is, the eNB may use one bit only to indicate whether the activated component carriers are added into the PDCCH monitoring set. If one newly activated component carrier is added into the PDCCH monitoring set, the eNB may further indicate information of other component carriers that can be scheduled by a component carrier that is newly added into the PDCCH monitoring set, and the information of other component carriers includes the information of the component carriers, such as one or more selected from identifiers, frequency information or PCIs (Physical Cell Identities, physical cell identities) of the component carriers, that is, indicating which other component carriers can be scheduled by the component carrier that is newly added into the PDCCH monitoring set. The other scheduled component carriers may include other component carriers that are newly activated or other component carriers in the original PDSCH set. If the newly activated component carriers are not added into the PDCCH monitoring set, the eNB may further indicate specifically on which component carrier or which component carriers in the PDCCH monitoring set the newly activated component carriers that are not added into the PDCCH monitoring set yet are scheduled. In conclusion, the eNB may indicate to the UE a linkage (linkage) relationship between a CC in the PDCCH monitoring set and a CC in the PDSCH set, that is, if there is a linkage relationship between a component carrier in the PDCCH monitoring set and a carrier in the PDSCH set, it indicates that the component carrier that is in the PDSCH set may be scheduled on the component carrier in the PDCCH monitoring set.

In addition, if the newly activated component carrier is an extension CC (Extension CC) or CC segment (CC segment), the extension CC or CC segment refers to a CC incapable of independent work itself, that is, a CC which has no PDCCH channel, and on which scheduling cannot be performed, and which is only capable of being scheduled and used depending on the control by another CC having the PDCCH channel. That is, the scheduling information of the extension CC or the CC segment is required to be obtained on another CC that has the PDCCH channel, so the eNB may further indicate the component carrier scheduling the extension CC or CC segment in the PDCCH command for activating CCs. The component carrier scheduling the extension CC or CC segment may be a component carrier in a current PDCCH monitoring set and may also be a component carrier that is required to be added into the PDCCH monitoring set and is indicated in the PDCCH command for activating the component carriers.

Optionally, the eNB may multiplex a PDCCH command used for performing carrier activation or deactivation on a CC and a PDCCH command used for updating a PDCCH monitoring set, that is, in a PDCCH command, a piece of instruction information, for example, a bit, may be used to indicate whether the current PDCCH command is used for activating a component carrier or used for updating the PDCCH monitoring set. For example, when the instruction bit is 1, it may represent that the PDCCH command is used for activating the CC, and at the same time it is indicated in the PDCCH command that the PDCCH monitoring set is required to be updated by the UE. When the instruction bit is 0, the PDCCH command may be used for updating the PDCCH monitoring set.

Optionally, the eNB may also activate one or more component carriers for the UE and at the same time replace or remove a part or all of CCs in the current PDCCH monitoring set of the UE, that is, the eNB uses the PDCCH command to activate a new component carrier for the UE and at the same time send identifiers of one or more CCs that are required to be replaced or removed from the PDCCH monitoring set and instruction information of the replacement or removal to the UE.

Optionally, the eNB may remove the one or more CCs in the current PDCCH monitoring set from the PDCCH monitoring set and at the same time indicate in the PDCCH command whether the CCs are required to be removed from the PDSCH monitoring set, that is, the eNB may instruct whether to deactivate the CCs removed from the PDCCH monitoring set. If a CC is removed from the PDSCH monitoring set, the CC is to be deactivated, that is, the CC is no longer used for data transmission.

Step S32a: The user equipment adds, in accordance with the indication of the base station, one or more component carriers that are required to be added into a physical downlink control channel monitoring set into a physical downlink control channel monitoring set.

After receiving the PDCCH command sent by the eNB, the UE may determine, according to an instruction of the PDCCH command, newly activated CCs, and determine whether the newly activated one or more component carriers are required to be added into the PDCCH monitoring set, that is, the UE determines whether to update the current PDCCH monitoring set and add the CCs that are required to be added into the PDCCH monitoring set into the PDCCH monitoring set.

Step S33a: The user equipment sends a physical downlink control channel monitoring set update acknowledge message to the base station. Optionally, after updating the PDCCH monitoring set, the UE may send the PDCCH monitoring set update acknowledge instruction message to the eNB, and the instruction message may be one or more bits. In this embodiment, step S33a is only an optional procedure.

In this embodiment, the base station activates the component carrier and at the same time indicates, through a component carrier activation or configuration message, one or more component carriers that are required to be added into the physical downlink control channel monitoring set, so that the user equipment is capable of updating physical downlink control channel monitoring set, so as to implement monitoring on the PDCCH, and reduce an activation time delay of the component carrier.

In this embodiment, to reduce the times that the UE performs blind detection on the PDCCH, a PDCCH DCI format may be redesigned based on a PDCCH DCI (Downlink Control Information, downlink control information) format of the existing LTE (Long Term Evolution, Long Time Evolution). In the LTE, when detecting the PDCCH, the UE is required to consider whether information in the detected PDCCH is valid data, for example, it is indicated in the PDCCH information that a PUSCH (Physical Uplink Shared Channel, physical uplink shared channel) RB (Resource Block, resource block) number may be set to a multiple of 2, 3 or 5, which is referred to as a PUSCH RB assignment number. If the UE detect that the PUSCH RB number is different from the PUSCH RB assignment number, it is considered that the PDCCH is an invalid PDCCH. For the LTE-A UE, a non-PUSCH RB assignment number (for example, a PUSCH RB number that is not a multiple of 2, 3 or 5) may be used in the redesigned PDCCH DCI format to indicate the LTE-A UE that the PDCCH is used for activating or deactivating the CC, or indicate increase, deletion or reconfiguration of the CCs in the PDCCH monitoring set. Specifically, remaining bits in a redesigned DCI may include identifiers of the activated CCs and instruction information of whether the newly activated CCs are added into the PDCCH monitoring set mentioned in the embodiment, or, the remaining bits may include identifiers of the CCs that are required to be increased, deleted or reconfigured in the PDCCH monitoring set.

In addition, new bit instruction information may also be added into a physical downlink control channel of a conventional system from which a new system advances, to indicate that the physical downlink control channel command is used for activating one or more component carriers in the new system and used for updating a physical downlink control channel monitoring set, and then the remaining bits in the DCI include identifiers of the activated CCs and instruction information of whether the newly activated CCs are added into the PDCCH monitoring set mentioned in the embodiment, or the remaining bits may include identifiers of the CCs that are required to be increased, deleted or reconfigured in the PDCCH monitoring set. The new system may be further development of the conventional system.

Optionally, reserved bit instruction information in the physical downlink control channel of the conventional system may be used for indicating that the physical downlink control channel command is used for activating one or more component carriers in a new system and used for updating a physical downlink control channel monitoring set, and then other remaining bits in the DCI include identifiers of the activated CCs and instruction information of whether the newly activated CCs are added into the PDCCH monitoring set mentioned in the embodiment, or, the remaining bits may include identifiers of the CCs that are required to be increased, deleted or reconfigured in the PDCCH monitoring set.

In addition, in a connection process, when the eNB uses a PDCCH command to deactivate one or more CCs, and the PDCCH monitoring set may also be maintained at the same time: that is, when the PDCCH command is used to deactivate one or more CCs, the PDCCH monitoring set of the UE is updated again, and the eNB instructs the UE to add, delete or replace the CCs in the PDCCH monitoring set. Optionally, when the CC is deactivated, if the deactivated CC belongs to the PDCCH monitoring set, the eNB may instruct the UE to remove the CC from the PDCCH monitoring set, and to reallocate, according to a current CC configuration situation, the CCs in the PDCCH monitoring set, that is, to add, delete or replace the CCs in the PDCCH monitoring set, the update information is notified to the UE in the PDCCH command for deactivating the CCs, and then based on the update information indicated by the eNB, the UE adds, deletes or replaces the CCs in the PDCCH monitoring set.

Figure 3B:
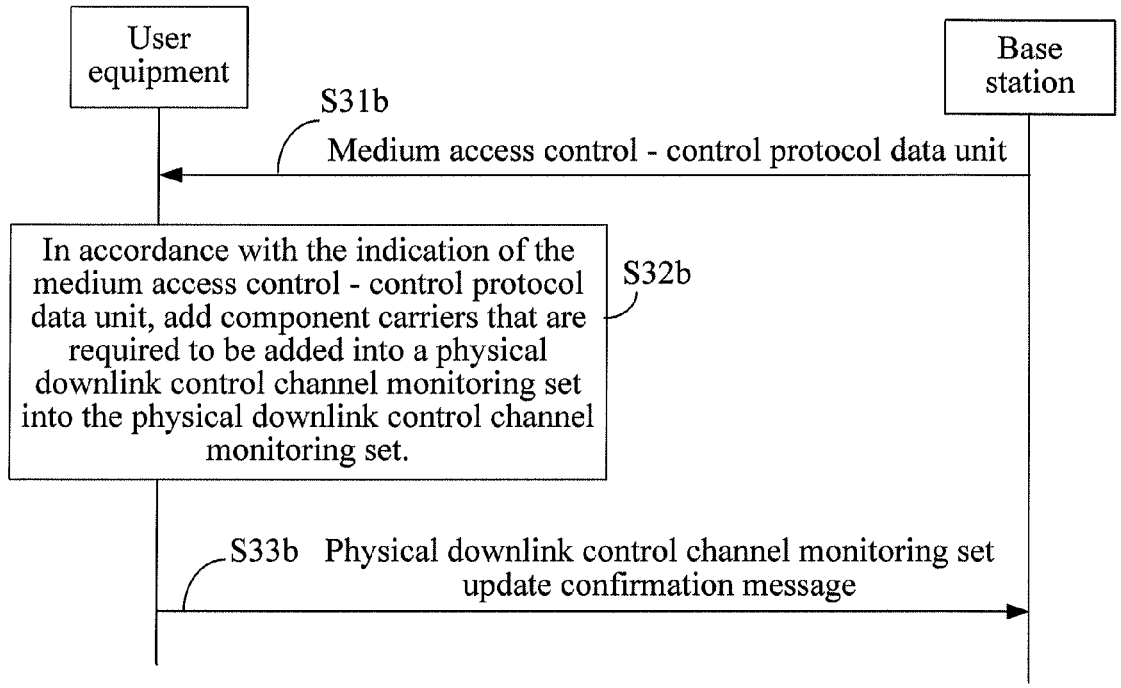
FIG. 3b is a simplified flow chart schematic diagram of another component carrier management method provided in an embodiment.

FIG. 3b is a simplified flow chart schematic diagram of another component carrier management method provided in an embodiment, in which the method includes:

Step S31b: A base station sends a medium access control-control protocol data unit to a user equipment to activate one or more component carriers and indicate one or more component carriers that are required to be added into a physical downlink control channel monitoring set.

Specifically, the base station (eNB, eNodeB) may send a MAC CE (Medium Access Control-Control Element, medium access control-control element) to the UE to activate one or more component carriers for the UE, and whether it is required to activate a component carrier and at the same time add the component carrier to the PDCCH monitoring set is indicated in the MAC CE. The eNB may add the one or more CCs in the PDSCH set to activate CCs. The activated CCs may be used for data transmission. Optionally, the eNB may also respectively indicate whether each component carrier in multiple newly activated component carriers is required to be added into the PDCCH monitoring set. The eNB may also indicate, in a concentrated manner, whether the newly activated component carriers are required to be added into the PDCCH monitoring set. If one newly activated component carrier is added into the PDCCH monitoring set, the eNB may further indicate information of other component carriers that can be scheduled by a component carrier that is newly added into the PDCCH monitoring set. The information of other component carriers includes information of the component carriers, such as one or more selected from identifiers, frequency information or PCIs of the component carriers, that is, representing which other component carriers can be scheduled by the component carrier newly added into the PDCCH monitoring set. The other scheduled component carriers may include other component carriers that are newly activated or other component carriers in the original PDSCH set. If the newly activated component carriers are not added into the PDCCH monitoring set, the eNB may further indicate specifically on which component carrier or which component carriers in the PDCCH monitoring set the newly activated component carriers that are not added into the PDCCH monitoring set yet are scheduled. In conclusion, the eNB may indicate to the UE a linkage (linkage) relationship between a CC in the PDCCH monitoring set and a CC in the PDSCH set, that is, if a linkage relationship exists between a component carrier in the PDCCH monitoring set and a carrier in the PDSCH set, it indicates that the component carrier that is in the PDSCH set may be scheduled on the component carrier in the PDCCH monitoring set and the component carrier in the PDCCH monitoring set has the linkage relationship with the component carrier in the PDCCH monitoring set.

In addition, if the newly activated component carrier is an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so the eNB may further indicate, in the MAE CE command of the activated component carrier, to schedule the component carrier of the extension CC. The component carrier for scheduling the extension CC may be a component carrier in a current PDCCH monitoring set and may also be a component carrier, which is required to be added into the PDCCH monitoring set and is instructed in the MAC CE command of the activated component carrier.

Optionally, the eNB may multiplex a MAC CE used for performing carrier activation or deactivation on a CC and a MAC CE used for updating a PDCCH monitoring set, that is, in a MAC CE command, one piece of instruction information may be used to indicate whether the current MAC CE command is used for activating a component carrier or used for updating a PDCCH monitoring set.

Optionally, the eNB may also activate one or more component carriers for the UE and at the same time replace or remove a part or all of CCs in the current PDCCH monitoring set of the UE, that is, the eNB uses the PDCCH command to activate a new component carrier for the UE and at the same time to send identifiers of one or more CCs that are required to be replaced or removed from the PDCCH monitoring set and the instruction information of replacement or removal to the UE.

Optionally, the eNB may remove the one or more CCs in the current PDCCH monitoring set from the PDCCH monitoring set and at the same time indicate, in the MAC CE command, whether the CCs are required to be removed from the PDSCH monitoring set, that is, the eNB may instruct whether to deactivate the CCs removed from the PDCCH monitoring set. If a C C is removed from the PDSCH monitoring set, the CC is to be deactivated, that is, the CC is no longer used for data transmission.

S32b: The user equipment adds, in accordance with the indication of the base station, one or more component carriers that are required to be added into the physical downlink control channel monitoring set into the physical downlink control channel monitoring set.

After receiving the MAC CE command sent by the eNB, the UE may determine, according to an instruction of the MAC CE command, newly activated CCs, and determine, according to the instruction of the MAC CE command, whether the one or more newly activated component carriers are required to be added into the PDCCH monitoring set, that is, the UE determines whether to update the current PDCCH monitoring set and add the CC that are required to be added into the PDCCH monitoring set into the PDCCH monitoring set.

Step S33b: The user equipment sends a physical downlink control channel monitoring set update acknowledge message to the base station. Optionally, after updating the PDCCH monitoring set, the UE may send a PDCCH monitoring set update acknowledge instruction message to the eNB, and the procedure S33b is only an optional step.

In addition, in a connection process, when the eNB uses a MAC CE to deactivate one or more CCs, the PDCCH monitoring set may also be maintained: that is, when the MAC CE is used to deactivate one or more CCs, the PDCCH monitoring set of the UE is updated again, and the eNB instructs the UE to add, delete or replace CCs in the PDCCH monitoring set. Optionally, when the CC is deactivated, if the deactivated CC belongs to the PDCCH monitoring set, the eNB may instruct the UE to remove the CC from the PDCCH monitoring set, and according to a current CC configuration situation, to reallocate the CCs in the PDCCH monitoring set, that is, to add, delete or replace the CCs in the PDCCH monitoring set, and in the MAC CE of the deactivated CC, the update information is notified to the UE, and then based on the update information indicated by the eNB, the UE adds, deletes or replaces the CCs in the PDCCH monitoring set.

Figure 4:
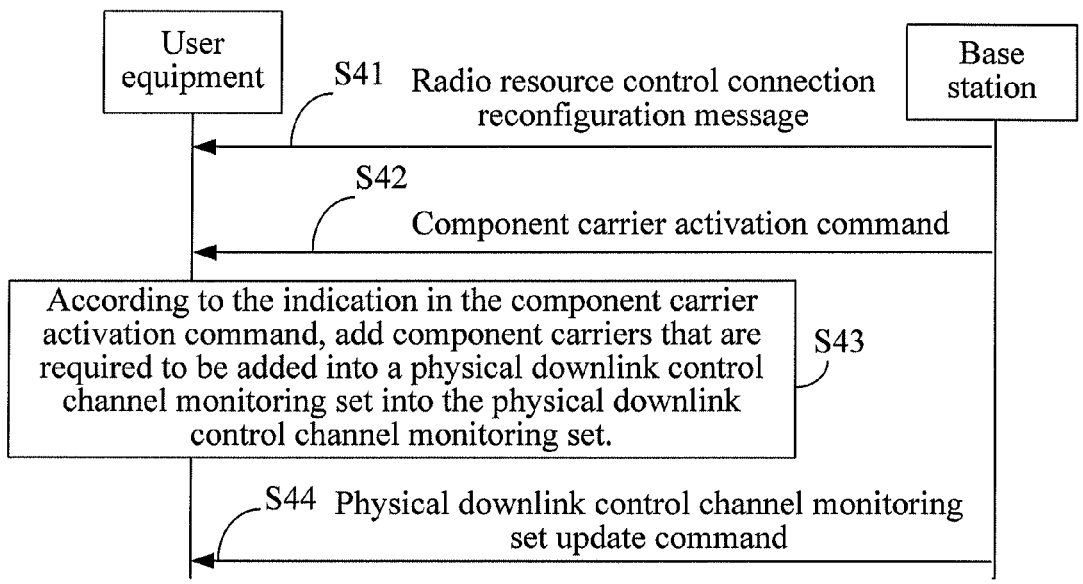
FIG. 4 is a simplified flow chart schematic diagram of another component carrier management method provided in an embodiment.

FIG. 4 is a simplified flow chart schematic diagram of another component carrier management method provided in an embodiment, in which the method includes:

Step S41: A base station sends a radio resource control connection reconfiguration message to a user equipment to indicate one or more component carriers that are required to be added into a physical downlink control channel monitoring set.

The RRC connection reconfiguration message sent by the eNB to the UE may include instruction information of whether one or more newly allocated or reconfigured CCs are required to be added into a PDCCH monitoring set after the CCs are activated. In addition, the RRC connection reconfiguration message may further include instruction information indicating on which CCs the CCs that are activated and are not added into the PDCCH monitoring set shall be scheduled. The CC for scheduling may be a CC in the original PDCCH monitoring set or a CC that is activated and is required to be added into the PDCCH monitoring set. That is to say, a linkage relationship may exist between a CC that is not added into the PDCCH monitoring set when being activated and a CC in the current PDCCH monitoring set, or a linkage relationship exists between a CC that is not added into the PDCCH monitoring set when being activated and a CC that is required to be added into the PDCCH monitoring set when being activated.

S42: The user equipment receives a component carrier activation command from the base station.

S43: The user equipment adds, according to an indication of the base station, one or more component carriers that are required to be added into the physical downlink control channel monitoring set into the physical downlink control channel monitoring set.

When the UE receives a command that is of activating one or more component carriers and is sent by the eNB, if the CC is instructed, in an RRC connection reconfiguration message, to be added into a PDCCH set, the UE adds the CC to the PDCCH monitoring set; and if the CC is instructed not to be added into the PDCCH set during RRC connection reconfiguration, the UE only adds the CC to the PDSCH CC set, that is, only activates the CC.

In addition, if the newly activated component carrier is an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so the eNB may further instruct, in the component carrier activation command, to schedule the component carrier of the extension CC. The component carrier of the extension CC to be scheduled may be a component carrier in a current PDCCH monitoring set, and may also be a component carrier that is required to be added into the PDCCH monitoring set instructed in the component carrier activation command.

S44: Furthermore, in a connection procedure of the UE, the base station may continue sending a physical downlink control channel monitoring set update command to the user equipment to update component carriers in the physical downlink control channel monitoring set of the UE.

Optionally, the eNB may continue using one RRC message, MAC control PDU or physical layer signaling to maintain or update the PDCCH monitoring set. In addition, the eNB may also use the RRC connection reconfiguration message to reset a CC that is required to be added into the PDCCH monitoring set when a component carrier in a configuration state is activated, and use the RRC connection reconfiguration message to notify the UE of instruction information of whether the one or more reset CCs are required to be added into the PDCCH monitoring set when being activated. That is to say, before a certain CC configured for the UE is activated, the eNB may change, through the RRC connection reconfiguration message, pre-configuration information of whether to add the CC into the PDCCH monitoring set when being activated, where the pre-configuration information is preconfigured for the CC.

Optionally, in a connection process, the eNB may update the PDCCH monitoring set of the UE again when the RRC connection reconfiguration message is used to deactivate or de-configure one or more CCs, that is, the eNB instructs the UE to update the CCs in the PDCCH monitoring set, that is, to add, delete or replace the CCs in the PDCCH monitoring set. Optionally, when a CC is deactivated, if the deactivated CC belongs to the PDCCH monitoring set, the eNB may instruct the UE to remove the CC from the PDCCH monitoring set, and according to a current CC configuration situation, to reallocate CCs in the PDCCH monitoring set, that is, to add, delete or replace the CCs in the PDCCH monitoring set, the RRC connection reconfiguration message or CC deactivation message is used to notify the update information to the UE, and then based on the update information indicated by the eNB, the UE adds, deletes or replaces the CCs in the PDCCH monitoring set.

Alternatively, when the eNB removes one or more CCs from a configured CC set, the eNB re allocates, according to a current CC configuration situation, the CCs in the PDCCH monitoring set, that is, adds, deletes or replaces the CCs in the PDCCH monitoring set, and uses the RRC connection reconfiguration message or CC deactivation message to notify the UE.

In addition, the eNB may also reset whether to add a CC currently in a configuration state to the PDCCH monitoring set when being activated, and use the RRC connection reconfiguration message or deactivation message to notify the reset instruction information to the UE.

In this embodiment, the RRC connection reconfiguration message may also be replaced by other RRC messages or MAC CE (Control Element) signaling to implement the same function, that is, the embodiment is not only limited to the use of the RRC connection reconfiguration message.

In this embodiment, when performing RRC connection reconfiguration on the CC for the UE, the base station indicates whether one or more CCs are required to be added into the PDCCH monitoring set when the one or more CCs are activated, and after the CC activation command is received, the UE adds the indicated CC into the PDCCH monitoring set, and may continue maintaining the PDCCH monitoring set to implement monitoring on the PDCCH subsequently.

Figure 5:
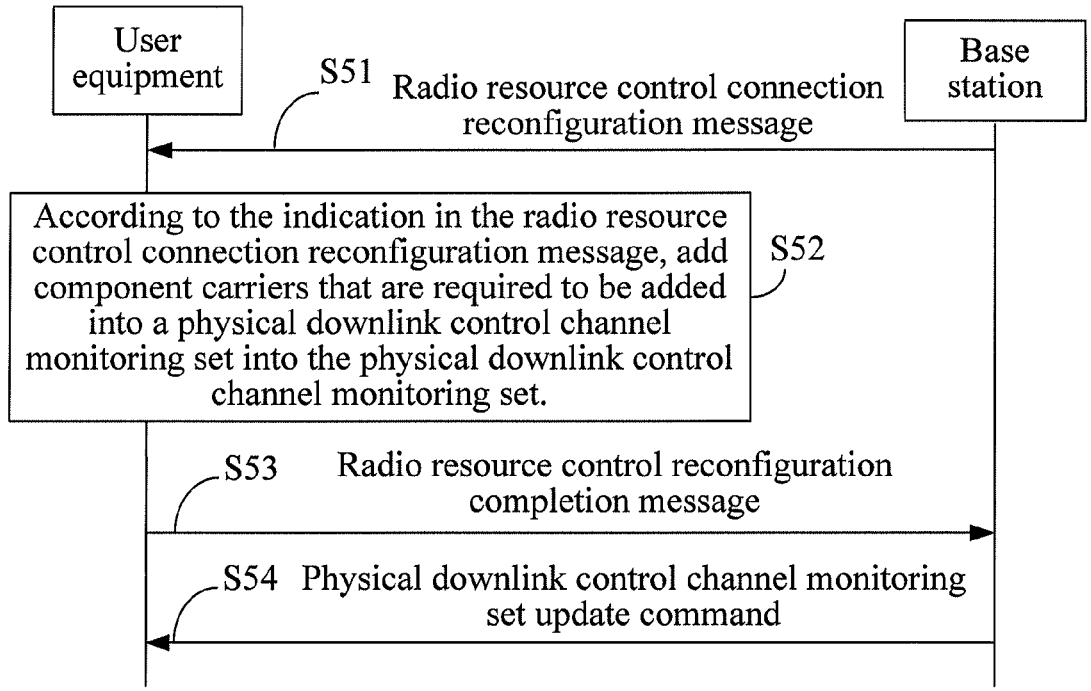
FIG. 5 is a simplified flow chart schematic diagram of another component carrier management method provided in an embodiment.

FIG. 5 is a simplified flow chart schematic diagram of another component carrier management method provided in an embodiment, in which the method includes:

Step S51: A base station sends a radio resource control connection reconfiguration message to a user equipment to activate one or more component carriers, and indicate one or more component carriers that are required to be added into a physical downlink control channel monitoring set.

The difference between this embodiment and the embodiment in FIG. 4 lies in that the RRC connection reconfiguration message implements the function of configuring CC and at the same time also has the function of activating a CC, that is, the RRC connection reconfiguration message implements configuration and activation of the CC at the same time, and meanwhile it is indicated, in the RRC connection reconfiguration message, which CCs are required to be added into the PDCCH monitoring set. While the eNB configures and activates one or more component carriers, instruction information of whether to add a part or all of component carriers into the PDCCH monitoring set may be added into the RRC connection reconfiguration message. Optionally, if multiple CCs are configured and activated at the same time, the eNB may respectively indicate whether each CC is added into the PDCCH monitoring set; or the eNB may also only indicate CCs that are required to be added into the PDCCH monitoring set, and the CCs that are not indicated are not added into the PDCCH monitoring set by default. The eNB may also indicate, in a concentrated manner, whether newly configured and activated component carriers are added into the PDCCH monitoring set when being activated, that is, the eNB may use one piece of instruction information to indicate whether the newly configured and activated component carriers are added into the PDCCH monitoring set.

If the newly activated component carrier is added into the PDCCH monitoring set, the eNB may further indicate information of other component carriers that can be scheduled by the component carriers that are added into the PDCCH monitoring set. The information of other component carriers includes information such as one or more selected from identifiers, frequency information or PCIs of the component carriers, that is, representing which other component carriers can be scheduled by a component carrier that is newly added into the PDCCH monitoring set. The other scheduled component carriers may include other component carriers that are newly activated or other component carriers in an original PDSCH set. If the newly activated component carrier is not added into the PDCCH monitoring set, the eNB may further indicate on which component carrier or which component carriers in the PDCCH monitoring set the newly activated component carrier is scheduled. In conclusion, the eNB may indicate to the UE a linkage (linkage) relationship between a CC in the PDCCH monitoring set and a CC in the PDSCH set, that is, if a linkage relationship exists between one component carrier in the PDCCH monitoring set and one carrier in the PDSCH set, it indicates that the component carrier that is in the PDSCH set may be scheduled on the component carrier in the PDCCH monitoring set.

In addition, if the newly activated component carrier is an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so the eNB may further instruct, in an RRC connection reconfiguration message of the activated component carrier, to schedule the component carrier of the extension CC. The component carrier of the extension CC to be scheduled may be a component carrier in the current PDCCH monitoring set, and may also be a component carrier that is required to be added into the PDCCH monitoring set instructed in the RRC connection reconfiguration message.

Optionally, the eNB may also use the RRC connection reconfiguration message to configure and activate one or more new component carriers for the UE and at the same time replace or remove a part or all of CCs in the current PDCCH monitoring set of the UE, that is, the eNB uses the RRC connection reconfiguration message to configure and activate new component carriers for the UE, and at the same time provide identifiers of the one or more CCs that are required to be replaced or removed from the PDCCH monitoring set and instruction information of replacement or removal to the UE.

Step S52: The user equipment adds, according to the indication of the base station, one or more component carriers that are required to be added into the physical downlink control channel monitoring set in the physical downlink control channel monitoring set.

After receiving the RRC connection reconfiguration message sent by the eNB, the UE may determine, according to an instruction of the RRC connection reconfiguration message, to add newly activated CCs that are required to be added into the PDCCH monitoring set as instructed, and update the current PDCCH monitoring set.

Step S53: The user equipment sends a radio resource control reconfiguration completion message to the base station.

Optionally, after updating the PDCCH monitoring set, the UE may send the RRC connection reconfiguration completion message to indicate that the update of the PDCCH monitoring set is completed.

Step S54: Furthermore, in a connection process, the base station may continue sending a physical downlink control channel monitoring set update command to the user equipment to instruct the UE to update the physical downlink control channel monitoring set.

The eNB may continue using the RRC connection reconfiguration message to instruct the UE to update the PDCCH monitoring set. When the RRC connection reconfiguration message is used to remove one or more CCs from the PDCCH monitoring set, the eNB may indicate, in the RRC connection reconfiguration message, whether to remove one or more CCs from the PDCCH monitoring set and at the same time also to remove corresponding CCs from the PDSCH monitoring set, that is, whether to remove the CCs from the PDCCH monitoring set and at the same time deactivate the CCs. If all CCs in the current PDCCH monitoring set of the UE are required to be removed, the eNB may allocate, for the UE, a new CC used for monitoring PDCCH in the RRC connection reconfiguration message when the eNB removes the CCs.

Optionally, in a connection process, when the RRC connection reconfiguration message is used to deactivate one or more CCs, the eNB may update the PDCCH monitoring set of the UE again, that is, the eNB instructs the UE to update the CCs in the PDCCH monitoring set, that is, to add, delete or replace the CCs in the PDCCH monitoring set. Optionally, when a CC is deactivated, if the deactivated CC belongs to the PDCCH monitoring set, the eNB may instruct the UE to remove the CC from the PDCCH monitoring set, and according to a current CC configuration situation, reallocate the CCs in the PDCCH monitoring set, that is, add, delete or replace the CCs in the PDCCH monitoring set, the RRC connection reconfiguration message is used to notify the update information to the UE, and then based on the update information indicated by the eNB, the UE adds, deletes or replaces the CCs in the PDCCH monitoring set.

In this embodiment, when performing RRC connection reconfiguration on the CC for the UE, the base station activates CCs and indicates whether one or more CCs are required to be added into the PDCCH monitoring set when being activated, and subsequently the eNB may continue performing RRC connection reconfiguration on the CC for the UE to implement update and maintenance of the PDCCH monitoring set again.

Figure 6:
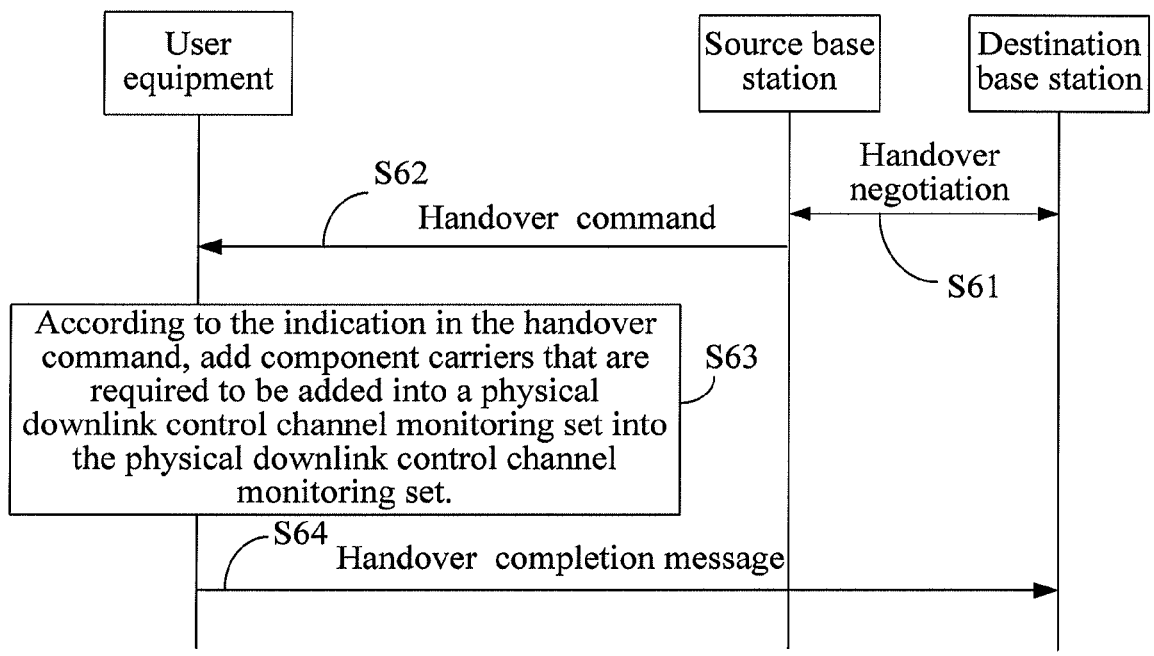
FIG. 6 is a simplified flow chart schematic diagram of another component carrier management method provided in an embodiment.

FIG. 6 is a simplified flow chart schematic diagram of another component carrier management method provided in an embodiment, in which the method includes:

Step S61: A source base station and a target base station perform handover negotiation.

Step S62: The source base station sends a handover command to the user equipment, and indicates, in the handover command, one or more component carriers that are required to be added into a physical downlink control channel monitoring set.

The eNB may send the handover command to the UE, or send an RRC connection reconfiguration message carrying mobility management. The message may include information of one or more component carriers configured by a target eNB for the UE and information of the PDCCH monitoring set that is required to be monitored by the UE.

In addition, if a newly activated component carrier is an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so the eNB may further instruct, in a handover command, to schedule a component carrier of the extension CC. The component carrier of the extension CC to be scheduled may be a component carrier in the current PDCCH monitoring set, and may also be a component carrier that is required to be added into the PDCCH monitoring set instructed in the handover command.

Step S63: The user equipment adds, according to the indication, one or more component carriers that are required to be added into the physical downlink control channel monitoring set into the physical downlink control channel monitoring set. The eNB subsequently monitors CCs in the PDCCH monitoring set to obtain scheduling information of one or more configured CCs.

Step S64: The user equipment sends a handover completion message to the target base station.

In this embodiment, when the UE is handed over from the source base station to the target base station, update information of the PDCCH monitoring set is acquired through a handover command of the source base station, that is, CCs that are required to be added into the PDCCH monitoring set are acquired, and after a CC activation command is received, the PDCCH monitoring set is updated to implement monitoring on the CCs. In this embodiment, the handover process is only briefly introduced, and a specific UE handover process further includes other procedures, which are described in detail in the prior art and are not introduced in this embodiment.

As one alternative solution for procedures S62 and S63 in this embodiment, the target eNB may also not send information of the PDCCH monitoring set to the UE in the handover command, but instead, after the target eNB receives the handover completion message sent by the UE (or the RRC connection reconfiguration completion message), the target eNB sends a component carrier activation command to the UE and indicates one or more component carriers that are required to be added into the PDCCH monitoring set. Specifically, a newly activated component carrier may be an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so the eNB may further instruct, in a component carrier activation command, to schedule component carrier of the extension CC. The component carrier of the extension CC to be scheduled may be a component carrier in a current PDCCH monitoring set, and may also be a component carrier that is required to be added into the PDCCH monitoring set instructed in the component carrier activation command.

Figure 7A:
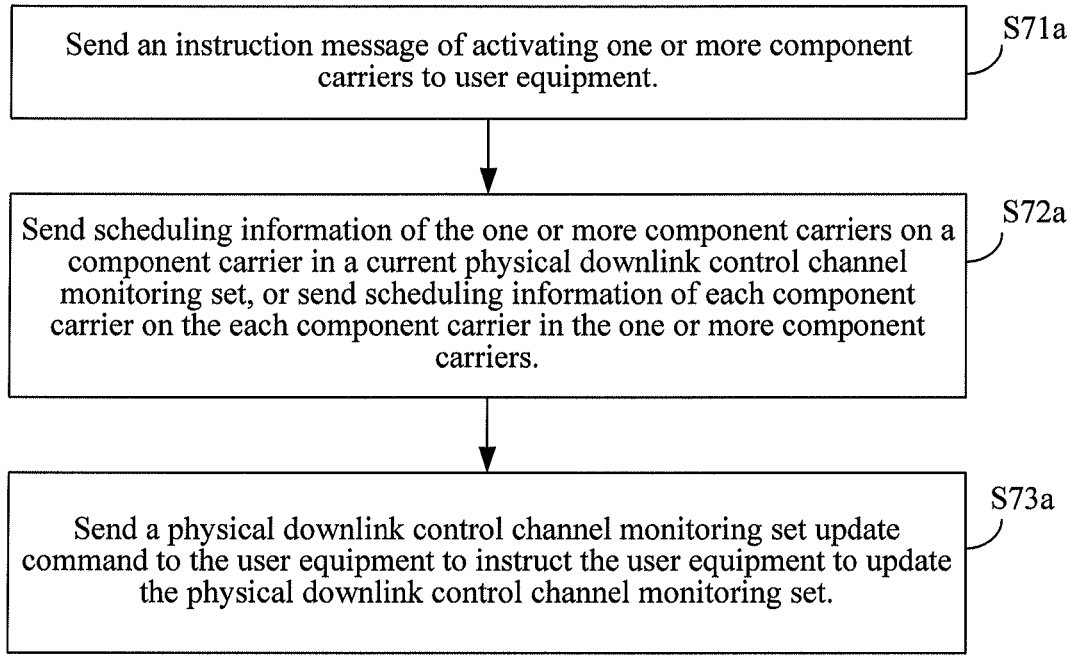
FIG. 7a is a schematic diagram of another component carrier management method provided in an embodiment.

FIG. 7a is a schematic diagram of another component carrier management method provided in an embodiment, in which the method includes:

Step S71a: Send an instruction message of activating one or more component carriers to a user equipment.

Step S72a: Send scheduling information of the one or more component carriers on a component carrier in a current physical downlink control channel monitoring set, or send, on each component carrier in the one or more component carriers, scheduling information of the each component carrier.

Step S73a: Send a physical downlink control channel monitoring set update command to the user equipment to instruct the user equipment to update the physical downlink control channel monitoring set.

In this embodiment, after the instruction of activating the component carriers, scheduling information of newly activated CCs may be sent on a CC in the current PDCCH monitoring set, and up date of the PDCCH monitoring set is subsequently implemented through a PDCCH monitoring set update command. For example, a current PDCCH monitoring set includes a component carrier A, and the base station newly activates a component carrier B for the user equipment, so the base station may send scheduling information of the component carrier B on the component carrier A, and after the scheduling is completed, the PDCCH monitoring set is updated through the signaling. If the one or more component carriers include one or more extension component carriers or component carrier segments, scheduling information of the one or more extension component carriers or carrier segments is then sent on a specified component carrier. In this embodiment, another implementation manner also exists, in which scheduling information of the CC is sent on one activated non-extension CC, and for an extension CC, scheduling information of the extension CC may be sent on a specified CC, and after the scheduling is completed, the PDCCH monitoring set is updated through signaling. In this embodiment, the extension CC is used for data transmission but is not a CC used for sending the scheduling information. When the component carrier is configured, the base station may indicate, to the user equipment, the CC used for sending the scheduling information of the extension CC. In this embodiment, after the CC is activated and the scheduling information is sent, the base station may further send a PDCCH monitoring set update instruction, and may, in the procedure of activating the CC for the UE, maintain the PDCCH monitoring set of the UE in real time, ensure a service requirement of the UE, and reduce an activation time delay of the CC. The eNB may indicate, to the UE, whether the eNB is to send scheduling information of the one or more component carriers on the component carrier in the current physical downlink control channel monitoring set, or send scheduling information of each component carrier itself on the each component carrier in the one or more component carriers, so that the UE receives the scheduling information in a corresponding manner.

Figure 7B:
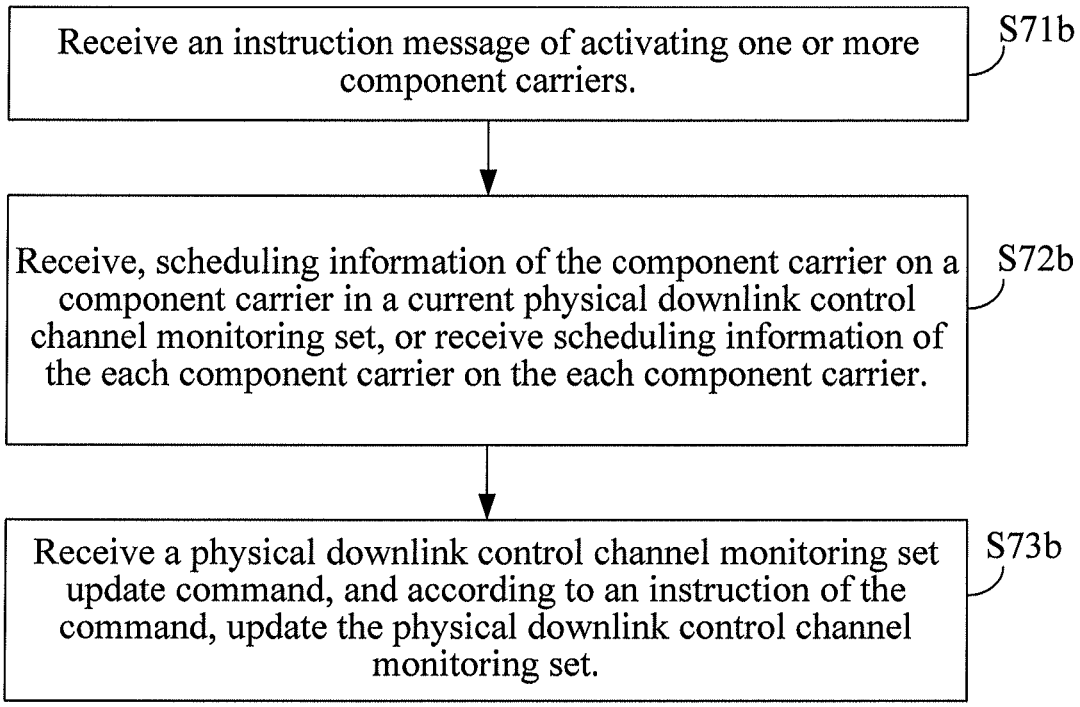
FIG. 7b is a schematic diagram of another component carrier management method provided in an embodiment.

FIG. 7b is a schematic diagram of another component carrier management method provided in an embodiment, in which the method includes:

Step S71b: Receive an instruction message of activating one or more component carriers.

Step S72b: Receive scheduling information of the one or more component carriers on a component carrier in a current physical downlink control channel monitoring set, or receive scheduling information of each component carrier itself on the each component carrier in the one or more component carriers.

Step S73b: Receive a physical downlink control channel monitoring set update command, and according to an instruction of the command, update the physical downlink control channel monitoring set.

In this embodiment, after CCs are activated, the UE may obtain scheduling information of newly activated CCs by monitoring the activated CCs or CCs in the current PDCCH monitoring set, and subsequently maintain the PDCCH monitoring set by receiving a PDCCH monitoring set update command from a base station. If the one or more component carriers include one or more extension component carriers or component carrier segments, scheduling information of the one or more extension component carriers or carrier segments is then received on a specified component carrier. In this embodiment, the extension CC is used for data transmission, but is not a CC used for sending the scheduling information. When configuration information of the base station is received, the user equipment may acquire, from the configuration information, a specified CC used for sending the scheduling information of the extension CC, and obtain the scheduling information of the extension CC by monitoring the specified CC. In this embodiment, after the scheduling information of the CC is received, the user equipment may further receive a PDCCH monitoring set update instruction, and implement maintenance the PDCCH monitoring set of the UE in real time, ensure a service requirement, and reduce an activation time delay of the CC. The UE may receive the instruction message from the eNB to acquire whether the eNB is to send scheduling information of the one or more component carriers on the component carrier in the current physical downlink control channel monitoring set, or send scheduling information of the each component carrier on the each component carrier in the one or more component carriers, so that the UE receives the scheduling information in a corresponding manner.

Figure 8:
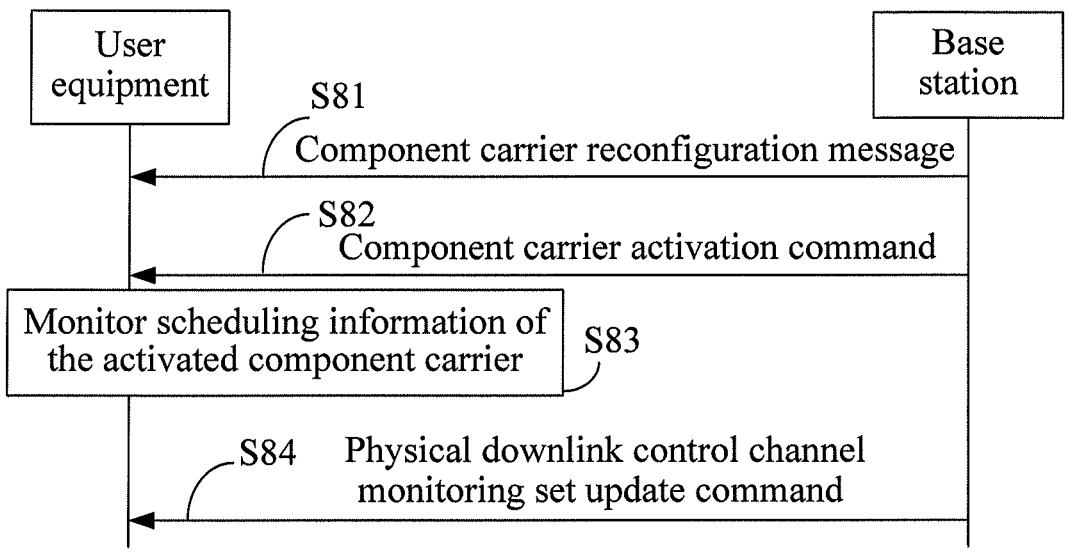
FIG. 8 is a simplified flow chart schematic diagram of another component carrier management method provided in an embodiment.

FIG. 8 is a simplified flow chart schematic diagram of another component carrier management method provided in an embodiment, in which the method includes:

Step S81: A base station sends a component carrier reconfiguration message to a user equipment.

Optionally, after establishment of an RRC (Radio Resource Control, radio resource control) connection with the UE is completed, the eNB may newly configure, based on a service requirement of the UE or other QoS (Quality of Service, quality of service) requirement, one or more component carriers for the UE. If the newly configured component carrier is an extension CC (Extension CC) or CC segment (CC segment), the extension CC or CC segment refers to a CC incapable of independent work itself, that is, a CC that has no PDCCH channel and is incapable of scheduling and is only capable of being scheduled and used depending on the control by other CCs having the PDCCH channel. That is, scheduling information of the extension CC is required to be obtained on the other CCs, so, from the PDCCH monitoring set or component carriers that are being activated, the eNB may further specify, for the UE, one or more component carriers used for scheduling the extension CC. The component carrier reconfiguration message may be an RRC message, a MAC (Media Access Control, medium access control) control PDU (Protocol Data Unit, protocol data unit) or physical layer control signaling.

Step S82: The base station sends a component carrier activation command to the user equipment.

When the eNB activates one or more new component carriers for the UE, the UE may adopt one of the following manners to obtain scheduling information of newly activated CCs:

Manner 1: A scheduling manner 1a may be used for the newly activated CCs by default, that is, the scheduling information of one newly activated CC is sent to the UE on a PDCCH channel of the CC itself, that is, the UE adds each newly activated CC into the PDCCH monitoring set; if the newly activated CC is an extension component carrier (extension CC), the extension CC may perform scheduling on a specified component carrier used for scheduling the extension CC.

Manner 2: A manner 1b may be used for scheduling the newly activated CCs, that is, the newly activated CCs are scheduled by one or more CCs in a current PDCCH monitoring set. Furthermore, the eNB may specify, for the UE, one or more component carriers for scheduling the newly activated CCs.

Manner 3: According to a current existing PDSCH monitoring set and a situation of the PDCCH monitoring set, or according to a current CC scheduling situation of the eNB and/or the number of CCs that are required to be newly activated, the eNB may determine whether the manner 1a or the manner 1b is used for a current newly activated component carrier, if the eNB determines to use the manner 1b for scheduling, one or more component carriers for scheduling the newly activated CCs may be further specified for the UE. That is, the eNB specifies a linkage relationship between the CC in the current PDCCH monitoring set and a newly activated CC.

Step S83: The user equipment monitors scheduling information of the activated component carrier.

Corresponding to the manner 1, the UE may monitor one newly activated CC to obtain scheduling information of the newly activated CC, that is, add the newly activated CC to the PDCCH monitoring set; if the newly activated CC is an extension component carrier (extension CC), the monitoring may be performed on a specified component carrier. Corresponding to the manner 2, the UE may perform monitoring on one or more CCs in the current PDCCH monitoring set to obtain scheduling information of the newly activated CCs.

S84: Furthermore, in a connection process of the UE, the base station may continue sending a dedicated physical downlink control channel monitoring set update command to the user equipment to instruct the UE to update the physical downlink control channel monitoring set, and the step is an optional step. The eNB may use an RRC message, MAC control PDU or physical layer signaling to instruct the UE to update the PDCCH monitoring set, that is, instruct the UE to add, remove or reconfigure CCs in the PDCCH monitoring set.

In this embodiment, the base station configures CCs for the UE, and activates one or more CCs, the UE adds the newly activated CCs to the PDCCH monitoring set and monitors one newly activated CC to obtain scheduling information of the newly activated CC, subsequently the eNB may instruct the UE to update the physical downlink control channel monitoring set, and after the UE updates the physical downlink control channel monitoring set, the UE may implement subsequent monitoring on the PDCCH.

Figure 9:
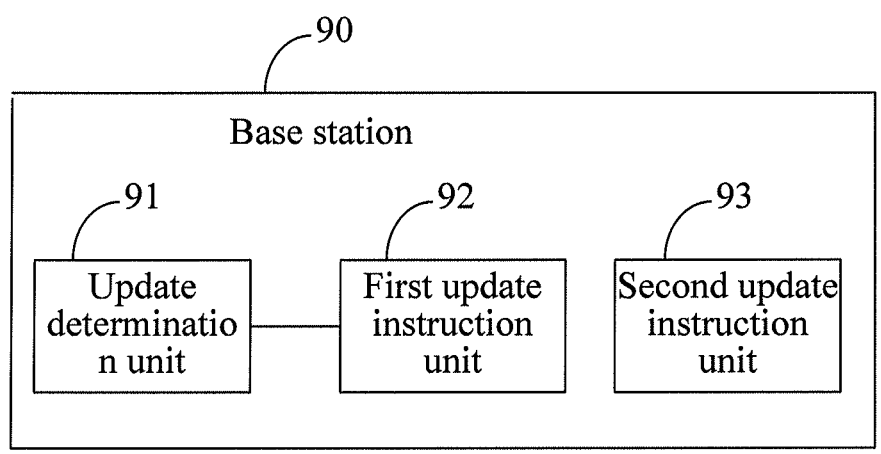
FIG. 9 is a schematic diagram of a base station provided in an embodiment.

Corresponding to the method embodiments, embodiments of equipment are provided to implement the method, and it may be understood that the equipment may be implemented by hardware, software or a combination of the hardware and software.

FIG. 9 is a schematic diagram of a base station 90 provided in an embodiment, in which the base station 90 includes:

an update determination unit 91, configured to determine, in component carriers to be activated or to be configured, one or more component carriers that are required to be added into a physical downlink control channel monitoring set; and a first update indication unit 92, configured to send a component carrier activation or configuration message to a user equipment to indicate one or more component carriers that are required to be added into the physical downlink control channel monitoring set.

The base station 90 in this embodiment may send the component carrier activation or configuration message to indicate, to the UE, CCs that are added into the PDCCH monitoring set.

The first update indication unit 92 may include: a physical downlink control channel command indication module, configured to send a physical downlink control channel command to the user equipment to activate one or more component carriers and indicate one or more component carriers that are required to be added into the physical downlink control channel monitoring set; or a medium access control protocol data unit indication module, configured to send a medium access control protocol data unit to the user equipment to activate one or more component carriers and indicate one or more component carriers that are required to be added into the physical downlink control channel monitoring set; or a radio resource control signaling indication module, configured to send radio resource control signaling to the user equipment to reallocate or reconfigure one or more component carriers for the user equipment and indicate one or more component carriers that are required to be added into the physical downlink control channel monitoring set when the reallocated or reconfigured component carriers are activated; or a handover instruction module, configured to send a handover command to the user equipment to instruct the user equipment to be handed over from a source base station to a target base station and indicate one or more component carriers that are required to be added into the physical downlink control channel monitoring set. The first update indication unit 92 may indicate, through the PDCCH command, the handover command or the RRC signaling, the CCs that are required to be added into the PDCCH monitoring set. The base station 90 may further include: a second update instruction unit 93, configured to send a physical downlink control channel monitoring set update command to the user equipment to instruct the user equipment to update the physical downlink control channel monitoring set. The second update instruction unit 93 implements subsequent update of the PDCCH monitoring set by sending the PDCCH monitoring set update command, where the update is performed by the UE. It may be understood that all units and functional modules in the base station in this embodiment may execute corresponding processes in the foregoing method embodiments. For example, the first update indication unit 92 is further configured to indicate, through the component carrier activation or configuration message, a component carrier monitored on one or more component carriers that are required to be added into the physical downlink control channel monitoring set, or is further configured to indicate, through the component carrier activation or configuration message, a component carrier that is required to be replaced or removed from the physical downlink control channel monitoring set.

Figure 10:
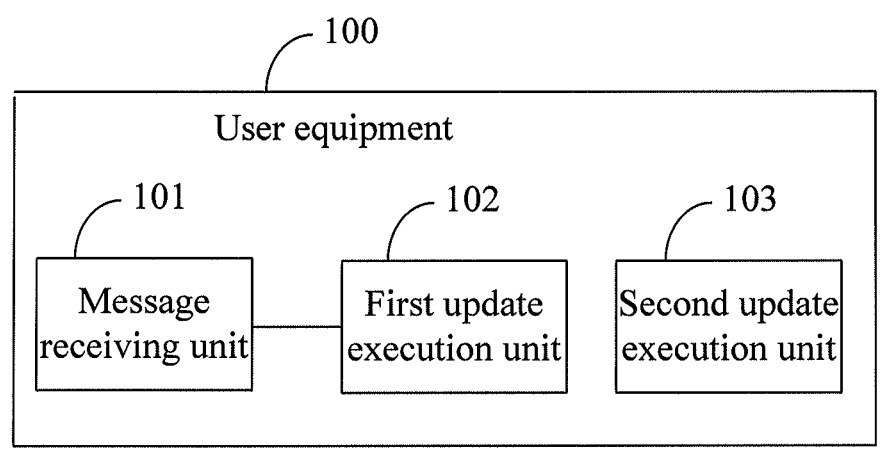
FIG. 10 is a schematic diagram of the user equipment provided in an embodiment.

FIG. 10 is a schematic diagram of a user equipment 100 provided in an embodiment, in which the user equipment 100 may include:

a message receiving unit 101, configured to receive a component carrier activation or configuration message, and according to an instruction of the component carrier activation or configuration message, acquire one or more component carriers that are required to be added into a physical downlink control channel monitoring set; and a first update execution unit 102, configured to add one or more component carriers that are required to be added into the physical downlink control channel monitoring set into the physical downlink control channel monitoring set.

The user equipment 100 in this embodiment receives the component carrier activation or configuration message, and acquire, through the instruction of the message, CCs that are required to be added into the PDCCH monitoring set, so as to facilitate update of the PDCCH monitoring set.

The message receiving unit 101 may further include: a physical downlink control channel command receiving module, configured to receive a physical downlink control channel command, acquire one or more component carriers that are required to be activated, and one or more component carriers that are required to be added into the physical downlink control channel monitoring set; or a medium access control protocol data unit receiving module, configured to receive a medium access control protocol data unit, and according to an instruction of the medium access control protocol data unit, acquire one or more component carriers that are required to be activated, and one or more component carriers that are required to be added into the physical downlink control channel monitoring set; or a radio resource control signaling receiving module, configured to receive a radio resource control signaling, acquire component carriers configured by the base station for the user equipment and one or more component carriers that are required to be added into the physical downlink control channel monitoring set when the reallocated or reconfigured component carrier are activated; or a handover command receiving module, configured to receive a handover command, acquire that the user equipment is required to be handed over to the target base station and one or more component carriers that are required to be added into the physical downlink control channel monitoring set. The user equipment may further include: a second update execution unit 103, configured to receive a physical downlink control channel monitoring set update command, and according to an instruction of the physical downlink control channel monitoring set update command, update the physical downlink control channel monitoring set. The second update execution unit 103 implements subsequent update of the PDCCH monitoring set by receiving a subsequent PDCCH monitoring set update command. It may be understood that all units and functional modules in the user equipment in this embodiment may execute corresponding processes in the foregoing method embodiments. For example, the message receiving unit 101 is further configured to, acquire, according to the instruction of the component carrier activation or configuration message, component carrier monitored on one or more component carriers that are required to be added into the physical downlink control channel monitoring set, or is further configured to, acquire, according to the instruction of the component carrier activation or configuration message, a component carrier that is required to be replaced or removed from the physical downlink control channel monitoring set.

Figure 11:
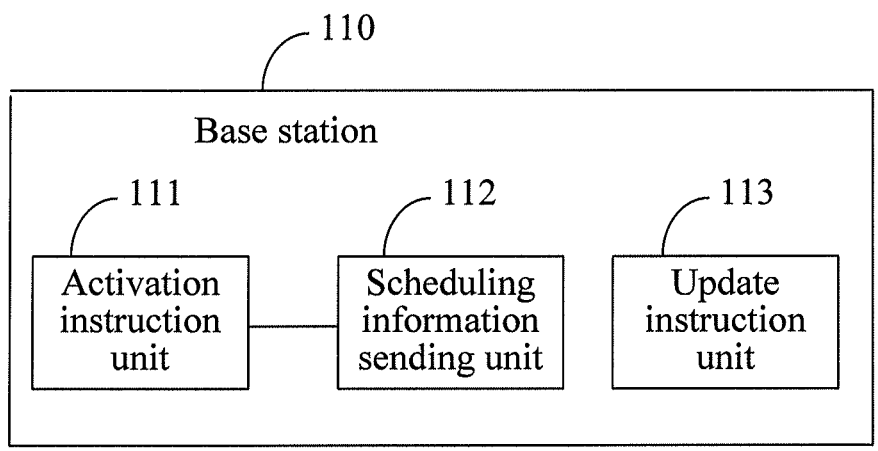
FIG. 11 is a schematic diagram of another base station provided in an embodiment.

FIG. 11 is a schematic diagram of another base station 110 provided in an embodiment, in which the base station 110 may include:

an activation instruction unit 111, configured to send an instruction message of activating one or more component carriers to a user equipment;

a scheduling information sending unit 112, configured to send scheduling information of the one or more component carriers on a component carrier in a current physical downlink control channel monitoring set, or send scheduling information of each component carrier on the each component carrier in the one or more component carriers; and an update instruction unit 113, configured to send a physical downlink control channel monitoring set update command to the user equipment to instruct the user equipment to update the physical downlink control channel monitoring set.

The base station 110 in this embodiment sends the scheduling information of the activated one or more component carriers to implement the update of the physical downlink control channel monitoring set. It may be understood that all units and functional modules in the base station in this embodiment may execute corresponding processes in the foregoing method embodiments. If the one or more component carriers include one or more extension component carriers or component carrier segments, the scheduling information sending unit 112 may send scheduling information of the one or more extension component carriers or carrier segments on a specified component carrier.

Figure 12:
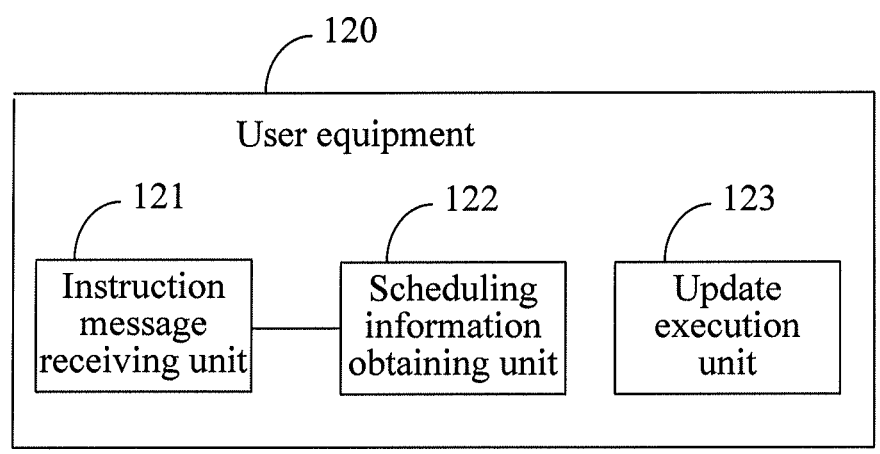
FIG. 12 is a schematic diagram of another user equipment provided in an embodiment.

FIG. 12 is a schematic diagram of another user equipment 120 provided in an embodiment, in which the user equipment 120 includes:

an instruction message receiving unit 121, configured to receive an instruction message of activating one or more component carriers;

a scheduling information obtaining unit 122, configured to receive scheduling information of the one or more component carriers on a component carrier in a current physical downlink control channel monitoring set, or receive scheduling information of each component carrier on the each component carrier in the one or more component carriers; and an update execution unit 123, configured to receive a physical downlink control channel monitoring set update command, and update, according to an instruction of the physical downlink control channel monitoring set update command, the physical downlink control channel monitoring set.

After obtaining scheduling information of activated CCs, the user equipment 120 in this embodiment further receives the PDCCH monitoring set update command to implement the update of the PDCCH monitoring set. It may be understood that all units and functional modules in the user equipment in this embodiment may execute corresponding processes in the foregoing method embodiments. If the one or more component carriers include one or more extension component carriers or component carrier segments, the scheduling information obtaining unit 122 may receive scheduling information of the one or more extension component carriers or carrier segments on a specified component carrier.

In the embodiment, during the activation or configuration of the CC, the PDCCH monitoring set of the UE may be managed, so that the UE may maintain the PDCCH monitoring set in real time to implement monitoring on the CC in the monitoring set and ensure a service requirement of the UE.

Those of ordinary skill in the art should understand that all or a part of the steps of the method according to the embodiments may be implemented by a program instructing relevant hardware. The program may be stored in a computer readable storage medium. When the program is run, the processes of the method according to the embodiments are performed. The storage medium may be a magnetic disk, an optical disk, a Read-Only Memory (Read-Only Memory, ROM) or Random Access Memory (Random Access Memory, RAM).

Only several embodiments are provided in the foregoing. Various changes and variations can be made to the present invention by persons skilled in the art based on the disclosure of the application document without departing from the idea and scope of the claims. Persons of ordinary skill in the art may understand that the embodiments or the features in different embodiments may be combined to form a new embodiment.

The invention claimed is:

1. A component carrier (CC) management method in a communication system, the system comprising a base station (BS) in communication with a user equipment (UE) via at least one CC, the method comprising:

selecting, by the BS, a first CC to be allocated to or reconfigured for the UE;

selecting, by the BS, a second CC designated to transmit scheduling information of the first CC;

encoding, by the BS, information of the first CC and the second CC into a radio resource control (RRC) message;

sending, by the BS, the RRC message to the UE;

receiving, by the UE, the RRC message;

decoding, by the UE, the first CC from the RRC message;

decoding, by the UE, the second CC from the RRC message; and monitoring, by the UE, a physical downlink control channel (PDCCH) of the second CC for scheduling information of the first CC when the first CC is activated.

2. The method of claim 1, wherein the RRC message is a RRC connection reconfiguration message.

3. The method of claim 1, further comprising:

sending, by the BS, a CC activation command to the UE for activating the first CC.

4. The method of claim 3, wherein the CC activation command comprises a medium access control-control element (MAC CE).

5. The method of claim 1, wherein the first CC and the second CC are different CCs.

6. The method of claim 1, wherein the first CC is an extension CC or a CC segment.

7. The method of claim 1, wherein the information of the first CC and the second CC comprises information of the first CC and information of a linkage relationship between the first CC and the second CC, the linkage relationship relating to scheduling of the first CC.

8. A communication system, comprising a base station (BS) in communication with a user equipment (UE) via at least one component carrier (CC), wherein the BS is configured to:

select a first CC to be allocated to or reconfigured for the UE;

select a second CC designated to transmit scheduling information of the first CC;

encode information of the first CC and the second CC into a radio resource control (RRC) message; and send the RRC message to the UE; and the UE is configured to:

receive the RRC message;

decode the first CC from the RRC message;

decode the second CC from the RRC message; and monitor a physical downlink control channel (PDCCH) of the second CC for scheduling information of the first CC when the first CC is activated.

9. The system of claim 8, wherein the RRC message is a RRC connection reconfiguration message.

10. The system of claim 8, wherein the BS is further configured to send a CC activation command to the UE for activating the first CC.

11. The system of claim 10, wherein the CC activation command comprises a medium access control-control element (MAC CE).

12. The system of claim 8, wherein the first CC and the second CC are different CCs.

13. The system of claim 8, wherein the first CC is an extension CC or a CC segment.

14. The system of claim 8, wherein the information of the first CC and the second CC comprises information of the first CC and information of a linkage relationship between the first CC and the second CC, the linkage relationship relating to scheduling of the first CC.

15. A base station (BS), being capable of communicating with a user equipment (UE) via at least one component carrier (CC), the BS comprising:
a processor; and
a non-transitory computer readable storage medium storing programming for execution by the processor, the programming including instructions that direct the processor to:
select a first CC to be allocated to or reconfigured for the UE;
select a second CC designated to transmit scheduling information of the first CC via a physical downlink control channel (PDCCH) of the second CC when the first CC is activated;
encode information of the first CC and the second CC into a radio resource control (RRC) message; and
send the RRC message to the UE.

16. The BS of claim 15, wherein the RRC message is a RRC connection reconfiguration message.

17. The BS of claim 15, wherein the processor is further directed to send a CC activation command to the UE for activating the first CC.

18. The BS of claim 17, wherein the CC activation command comprises a medium access control-control element (MAC CE).

19. The BS of claim 15, wherein the first CC and the second CC are different CCs.

20. The BS of claim 15, wherein the first CC is an extension CC or a CC segment.

21. A user equipment (UE), being capable of communicating with a base station (BS) via at least one component carrier (CC), the UE comprising:
a processor; and
a non-transitory computer readable storage medium storing programming for execution by the processor, the programming including instructions that direct the processor to:
receive a radio resource control (RRC) message sent by the BS;
decode a first CC from the RRC message, the first CC being allocated to or reconfigured for the UE;
decode a second CC from the RRC message, the second CC being designated to transmit scheduling information of the first CC; and
monitor a physical downlink control channel (PDCCH) of the second CC for scheduling information of the first CC when the first CC is activated.

22. The UE of claim 21, wherein the RRC message is a RRC connection reconfiguration message.

23. The UE of claim 21, wherein the processor is further directed to activate the first CC in accordance with a CC activation command sent by the BS.

24. The UE of claim 23, wherein the CC activation command comprises a medium access control-control element (MAC CE).

25. The UE of claim 21, wherein the first CC and the second CC are different CCs.

26. The UE of claim 21, wherein the first CC is an extension CC or a CC segment.

* * * * *